(12) United States Patent
Kanemitsu et al.

(10) Patent No.: US 8,964,069 B2
(45) Date of Patent: *Feb. 24, 2015

(54) IMAGE PROCESSING DEVICE AND SOLID-STATE IMAGING DEVICE INCLUDING A DEFECT CORRECTING FUNCTION

(75) Inventors: Shiroshi Kanemitsu, Kanagawa (JP); Kazuhiro Tabuchi, Kanagawa (JP); Takaaki Kawakami, Kanagawa (JP); Hirotoshi Aizawa, Kanagawa (JP); Jun Inagawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 510 days.

This patent is subject to a terminal disclaimer.

(21) Appl. No.: 12/853,635

(22) Filed: Aug. 10, 2010

(65) Prior Publication Data

US 2011/0069209 A1    Mar. 24, 2011

(30) Foreign Application Priority Data

Sep. 24, 2009    (JP) .................................. 2009-218926

(51) Int. Cl.
  *H04N 9/64* (2006.01)
  *H04N 5/367* (2011.01)

(52) U.S. Cl.
  CPC .................................. *H04N 5/3675* (2013.01)
  USPC ............................. 348/246; 348/247; 348/241

(58) Field of Classification Search
  CPC ....................................................... H04N 5/367
  USPC ......................................... 348/246, 247, 241
  See application file for complete search history.

(56) References Cited

U.S. PATENT DOCUMENTS

| 6,683,643 | B1 * | 1/2004 | Takayama et al. | 348/247 |
| 7,352,395 | B2 * | 4/2008 | An | 348/247 |
| 8,593,546 | B2 * | 11/2013 | Kanemitsu et al. | 348/246 |
| 2005/0030412 | A1 * | 2/2005 | Nakayama | 348/362 |
| 2009/0154826 | A1 * | 6/2009 | Park et al. | 382/260 |
| 2009/0310000 | A1 * | 12/2009 | Hosokawa et al. | 348/241 |

FOREIGN PATENT DOCUMENTS

| JP | 2-192373 | 7/1990 |
| JP | 10-322603 | 12/1998 |
| JP | 2003-116060 | 4/2003 |
| JP | 2005-184307 | 7/2005 |

(Continued)

OTHER PUBLICATIONS

U.S. Appl. No. 13/171,693, filed Jun. 29, 2011, Kanemitsu, et al.

(Continued)

*Primary Examiner* — Roberto Velez
*Assistant Examiner* — Cynthia Segura
(74) *Attorney, Agent, or Firm* — Oblon, Spivak, McClelland, Maier & Neustadt, L.L.P.

(57) ABSTRACT

According to one embodiment, an image processing device includes a defect correcting unit, a noise-reduction processing unit, and a selecting unit. The defect correcting unit executes defect correction on a target pixel. The defect correcting unit switches, according to the level of contrast determined concerning a plurality of peripheral pixels, a first correction value obtained through averaging processing for signal values of the peripheral pixels and a second correction value other than the first correction value.

14 Claims, 5 Drawing Sheets

(56) References Cited

FOREIGN PATENT DOCUMENTS

| | | |
|---|---|---|
| JP | 2005-528857 | 9/2005 |
| JP | 2006-26234 | 2/2006 |
| JP | 2008-252558 | 10/2008 |
| JP | 2008-258909 | 10/2008 |
| WO | WO 03/103275 A1 | 12/2003 |

OTHER PUBLICATIONS

Office Action issued Jan. 10, 2012 in Japanese Patent Application No. 2009-218926 (with English translation).

* cited by examiner

IMAGE PROCESSING DEVICE AND SOLID-STATE IMAGING DEVICE INCLUDING A DEFECT CORRECTING FUNCTION

CROSS-REFERENCE TO RELATED APPLICATIONS

This application is based upon and claims the benefit of priority from the prior Japanese Patent Application No. 2009-218926, filed on Sep. 24, 2009; the entire contents of all of which are incorporated herein by reference.

FIELD

Embodiments described herein relate generally to an image processing device and a solid-state imaging device.

BACKGROUND

In the past, some imaging device includes a defect correcting unit for correcting a defective portion (hereinafter referred to as "defect" as appropriate) of a digital image signal generated by a pixel that does not normally function. As defect correction known in general, there is a method of storing a position of a defect, for example, at the time of product shipment and interpolating information of peripheral pixels with respect to a target pixel as a target of the defect correction (static correction). In the static correction, a defect caused by a pixel that does not completely function can be corrected. On the other hand, it is difficult to correct a defect, a form of which changes according to conditions such as temperature and an analog gain. To correct such a defect, a technique for checking presence or absence of a defect during the operation of an imaging device and correcting a detected defect (dynamic correction) is proposed.

Some imaging device includes a noise-reduction processing unit for reducing noise such as random noise. When dedicated line memories are respectively provided in the defect correcting unit and the noise-reduction processing unit, a circuit size increases. When a common line memory is provided to feed back a result of the defect correction to the noise-reduction processing unit, if a wrong determination is made in the defect correcting unit, it is anticipated that image quality is deteriorated because noise reduction processing for several pixels after the wrong determination is affected. When the defect correction and the noise reduction are performed as parallel processing, a noise reduction effect is not obtained for pixels subjected to the defect correction.

Therefore, in the past, a technique for switching, according to a difference between a maximum and a minimum of signal values of a target pixel and peripheral pixels, correction values to be adopted for the target pixel is proposed (see, for example, Japanese Patent Laid-Open No. 2008-258909). As the correction values, for example, an average or a median of the signal values of the target pixel and the peripheral pixels or a value closest to the maximum or the minimum among the signal values is adopted. In this case, when an analog gain is set high because illuminance is low, in some case, because the influence of noise is intensified, the noise tends to be determined as a defect and the noise reduction effect is weakened. Depending on an output balance in the peripheral pixels, a shift occurs in the correction value and image quality is deteriorated.

DETAILED DESCRIPTION

In general, according to one embodiment, an image processing device includes a defect correcting unit, a noise-reduction processing unit, and a selecting unit. The defect correcting unit executes defect correction on a target pixel. The noise-reduction processing unit executes noise reduction processing on the target pixel and a plurality of peripheral pixels. The peripheral pixels are pixels for the same color as the target pixel and arranged around the target pixel. The selecting unit selects an output by the defect correcting unit or an output by the noise-reduction processing unit. The defect correcting unit includes a contrast determining unit and an averaging unit. The contrast determining unit determines the level of contrast by comparing a numerical value width between a maximum and a minimum of signal values of the peripheral pixels and a predetermined threshold. The averaging unit executes averaging processing for the signal values. The selecting unit selects the output from the defect correcting unit when it is determines that the target pixel is a defect. The defect correcting unit switches, according to the determination by the contrast determining unit, the output to a first correction value obtained through the averaging processing for the signal values of the peripheral pixels and a second correction value other than the first correction value.

Exemplary embodiments of an image processing device and a solid-state imaging device will be explained below in detail with reference to the accompanying drawings. The present invention is not limited to the following embodiments.

Figure 1:
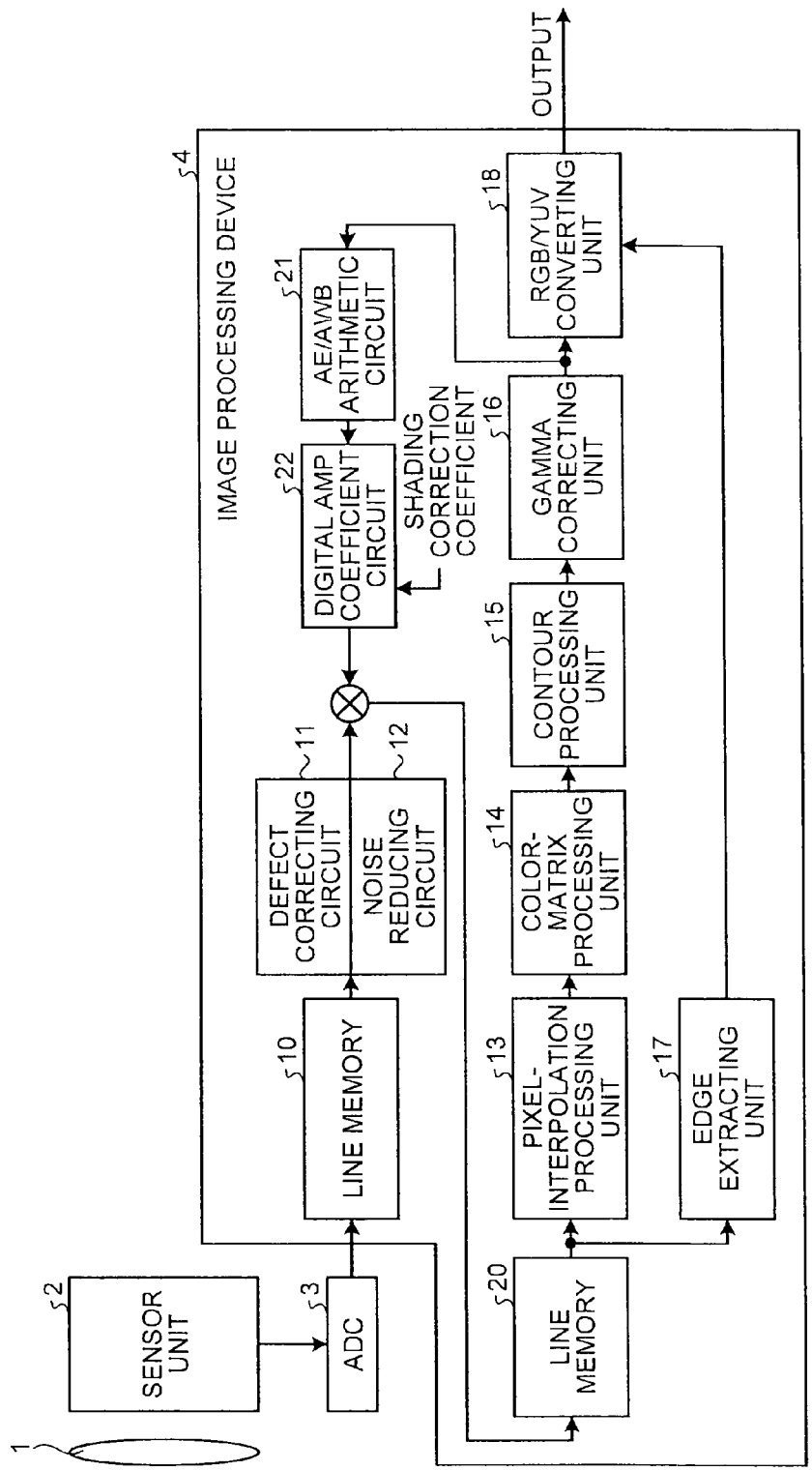
FIG. 1 is a block diagram of a solid-state imaging device according to a first embodiment.

FIG. 1 is a block diagram of a solid-state imaging device according to a first embodiment. The solid-state imaging device includes an imaging lens 1, a sensor unit 2, an analog-digital converter (ADC) 3, and an image processing device 4. The imaging lens 1 captures light from a subject. The sensor unit 2 is an imaging element that picks up a subject image by converting the light from the subject into signal charges. The sensor unit 2 captures signal values of R, G, and B in order corresponding to the Bayer array, sequentially amplifies captured analog image signals at a gain corresponding to an imaging condition designated from the outside, and outputs the amplified analog image signals. The ADC 3 converts the analog image signals output from the sensor unit 2 into digital image signals. The image processing device 4 applies various kinds of image processing to the digital image signals output from the ADC 3.

The image processing device 4 includes a defect correcting circuit (a defect correcting unit) 11, a noise reducing circuit (a noise-reduction processing unit) 12, a pixel-interpolation processing unit 13, a color-matrix processing unit 14, a contour processing unit 15, a gamma correction unit 16, an edge extracting unit 17, an RGB/YUV converting unit 18, an AE/AWB arithmetic circuit 21, a digital amplifier (AMP) coefficient circuit 22, and line memories 10 and 20.

The defect correcting circuit 11 executes defect correction on a target pixel as a target of the defect correction. The noise reducing circuit 12 executes noise reduction processing on the target pixel and a plurality of peripheral pixels. The peripheral pixels are pixels for the same color as the target pixel and arranged around the target pixel.

The pixel-interpolation processing unit 13 executes pixel interpolation processing (demosaic processing) on digital image signal transmitted in the order corresponding to the Bayer array. The color-matrix processing unit 14 executes color-matrix arithmetic processing (color reproducibility processing) for obtaining color reproducibility. The contour processing unit 15 executes contour enhancement processing using a correction coefficient calculated based on an imaging condition in the sensor unit 2 and the positions of the pixels.

The gamma correction unit 16 executes gamma correction for correcting the gradation of an image. The edge extracting unit 17 performs edge extraction and outputs an extraction result to the RGB/YUV converting unit 18. The RGB/YUV converting unit 18 converts an image signal subjected to the respective kinds of processing in the pixel-interpolation processing unit 13 to the gamma correction unit 16 from an RGB format to a YUV format. The AE/AWB arithmetic circuit 21 calculates, from a result of the gamma correction by the gamma correction unit 16, coefficients for Auto Exposure (AE) and Auto White Balance (AWB) and outputs the coefficients. The digital AMP coefficient circuit 22 calculates a digital AMP coefficient based on the output of the AE/AWB arithmetic circuit 21 and a shading correction coefficient. The line memories 10 and 20 temporarily store data of the digital image signals transmitted in the order corresponding to the Bayer array.

The image processing device 4 applies, in parallel, the defect correction by the defect correcting circuit 11 and the noise reduction by the noise reducing circuit 12 to the image signals stored in the line memory 10. In the image processing device 4, the defect correcting circuit 11 and the noise reducing circuit 12 share the line memory 10. Therefore, the size of the circuits can be suppressed compared with the size of the circuits in which line memories are respectively provided. The image processing device 4 applies digital gain AMP processing for the AE, the AWB, and lens shading correction to the image signals from the defect correcting circuit 11 and the noise reducing circuit 12 according to the digital AMP coefficient from the digital AMP coefficient circuit 22. The image signals subjected to the digital gain AMP processing are stored in the line memory 20.

The image processing device 4 sequentially executes, on the image signals stored in the line memory 20, the respective kinds of processing in the pixel-interpolation processing unit 13 to the RGB/YUV converting unit 18 and outputs the image signals converted into the YUV format by the RGB/YUV converting unit 18. The configuration of the image processing device 4 explained in this embodiment is only an example. Changes such as addition of components for other processing and omission of omittable components can be applied to the configuration.

Figure 2:
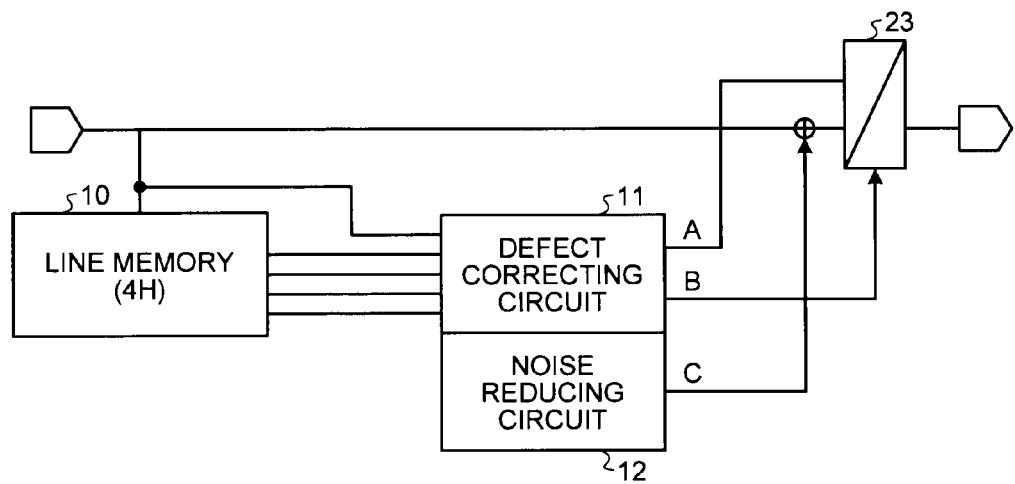
FIG. 2 is a block diagram of a configuration for defect correction and noise reduction processing.

FIG. 2 is a block diagram of a configuration for the defect correction and the noise reduction processing. The line memory 10 stores digital image signals for four lines (4H). Data of five lines in total including data for four lines stored in the line memory 10 and data for one line immediately before being input to the line memory 10 are input to the defect correcting circuit 11. A selector 23 functions as a selecting unit that selects an output by the defect correcting circuit 11 or an output by the noise reducing circuit 12.

Figure 3:
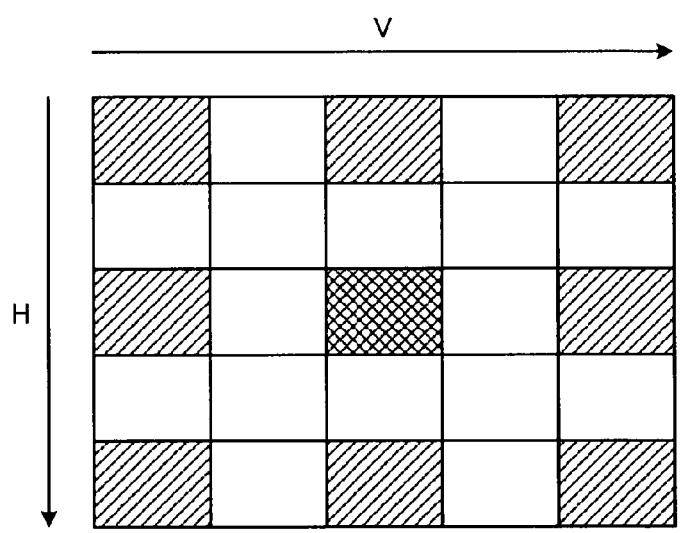
FIG. 3 is a diagram for explaining a target pixel and peripheral pixels.

FIG. 3 is a diagram for explaining a target pixel and peripheral pixels. The pixels are arrayed in two-dimensional directions including a horizontal (H) direction and a vertical (V) direction perpendicular to each other. The target pixel and the peripheral pixels are included in a matrix of 5×5 pixels in the H direction and the V direction among pixels arrayed in the Bayer array in the H direction and the V direction. The target pixel is a pixel located in the center of the 5×5 matrix (a screened portion in the figure). The peripheral pixels are eight pixels located above and below the target pixel, on the left and right of the target pixel, and in oblique directions from the target pixel at an interval of one pixel with respect to the target pixel (hatched portions in the figure). The target pixel and the peripheral pixels are pixels for the same color irrespectively of whether the target pixel is a pixel for R, G, or B. Signal values of the target pixel and the peripheral pixels are sequentially input every time the target pixel is shifted in the H direction. When input for one line in the H direction is completed, input for the next one line in the V direction is started.

Figure 4:
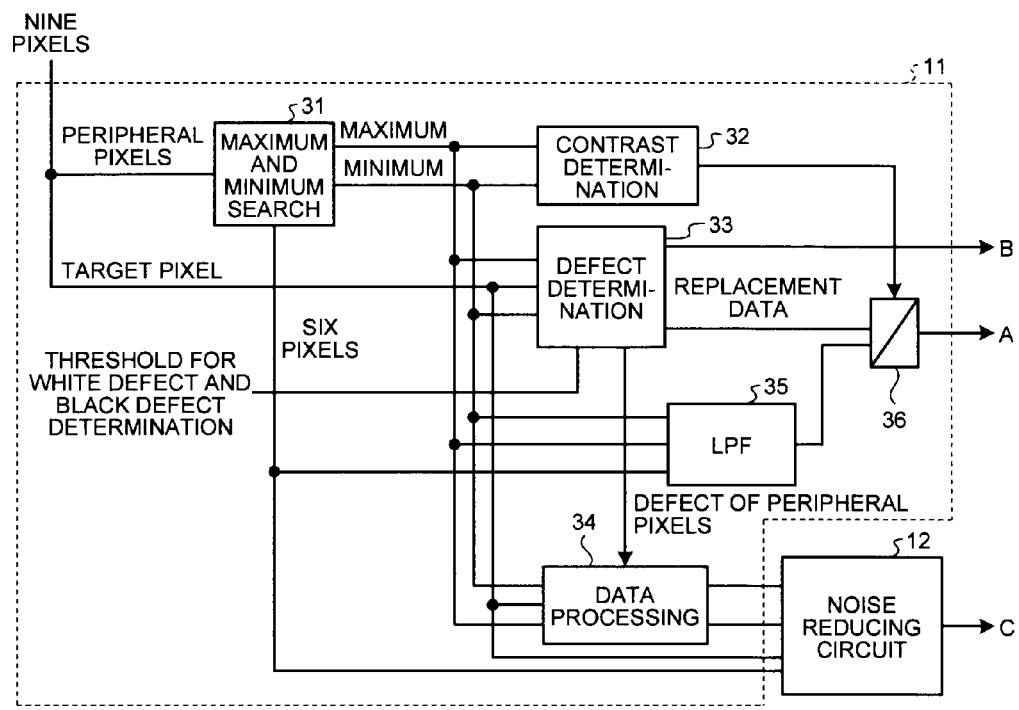
FIG. 4 is a block diagram of details of a defect correcting circuit and a noise reduction circuit.

FIG. 4 is a block diagram of details of the defect correcting circuit 11 and the noise reducing circuit 12. The defect correcting circuit 11 includes a maximum and minimum searching unit 31, a contrast determining unit 32, a defect determining unit 33, a data processing unit 34, a low pass filter (LPF) 35, and a selector 36.

The maximum and minimum searching unit 31 searches for a maximum and a minimum of the signal values of the eight peripheral pixels. The contrast determining unit 32 determines the level of contrast. The defect determining unit 33 determines presence or absence of a defect in the target pixel and the peripheral pixels. The data processing unit 34 executes replacement processing for data as a target of the noise reduction processing in the noise reducing circuit 12. Te LPF 35 functions as an averaging unit that executes averaging processing for signal values. The selector 36 selects an output from the defect determining unit 33 and an output from the LPF 35. In the following explanation "maximum" indicates a maximum of the signal values of the eight peripheral pixels and "minimum" indicates a minimum of the signal values of the eight peripheral pixels.

Among the signal values of the nine pixels including the target pixel and the peripheral pixels, the signal values of the eight peripheral pixels are input to the maximum and minimum searching unit 31. The maximum and minimum searching unit 31 outputs a maximum and a minimum obtained as search results. The defect determining unit 33 calculates a difference between the signal value of the target pixel and the maximum and a difference between the signal value of the target pixel and the minimum and performs defect determination. The defect determining unit 33 calculates (the signal value of the target pixel−the maximum) and (the minimum−the signal value of the target pixel) and performs defect determination based on calculation results including plus and minus.

As a defect as a target of the defect determination, there are a so-called black defect in which luminance is lower than luminance obtained when a pixel normally functions and a so-called white defect in which luminance is higher than the luminance obtained when the pixel normally functions. Thresholds as references for the defect determination are set in advance in the defect correcting circuit 11. As the thresholds for the defect determination, a threshold for black defect determination as a reference for determination of the black defect and a threshold for white defect determination as a reference for determination of the white defect are set. Both the threshold for black defect determination and the threshold for white defect determination are associated with an analog gain. Numerical values of the thresholds are changed according to a gain change.

Figure 5A:
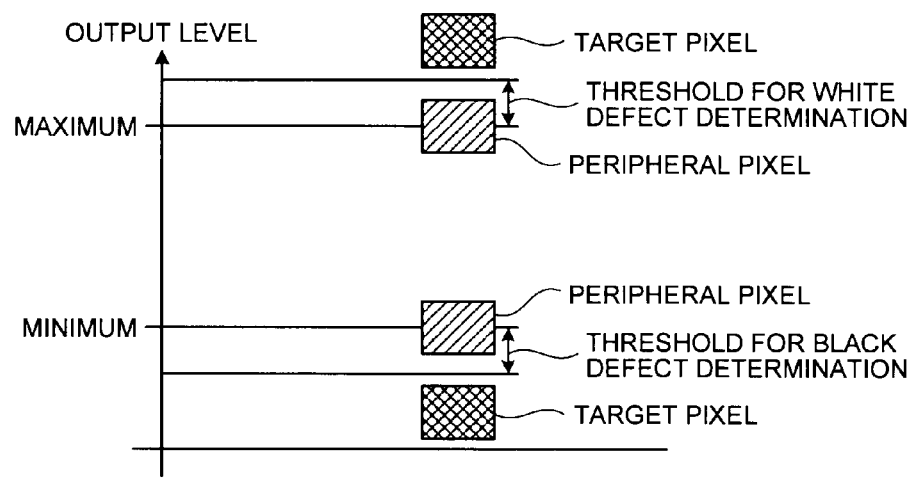
FIGS. 5A and 5B are conceptual diagrams for explaining defect determination.
Figure 5B:
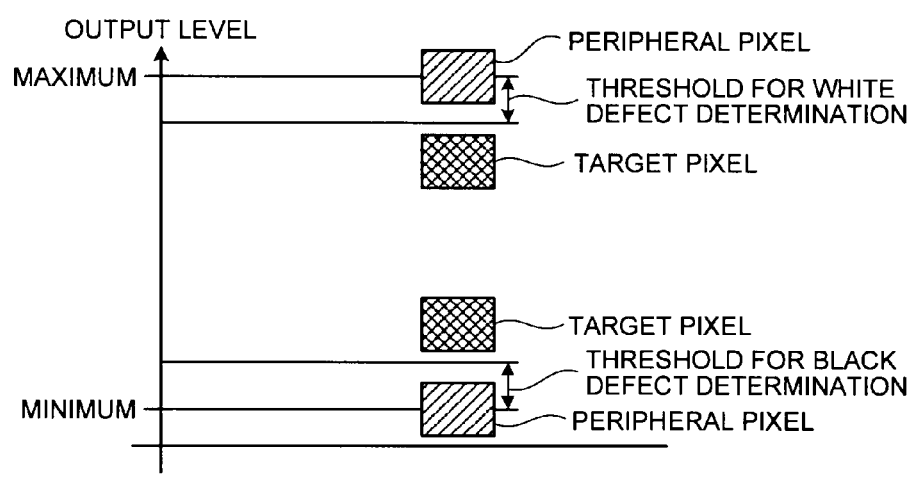

FIGS. 5A and 5B are conceptual diagrams for explaining the defect determination. In FIG. 5A, the target pixel is determined as a defect. In FIG. 5B, one of the peripheral pixels is determined as a defect. In FIGS. 5A and 5B, the ordinate represents an output level of a signal value. The center in the ordinate direction of a screened square represents a signal value of the target pixel. The center in the ordinate direction of a hatched square represents a signal value of the peripheral pixel.

When a calculation result of (the signal value of the target pixel−the maximum) is plus and an absolute value thereof is larger than the threshold for white defect determination, the defect determining unit 33 determines that the target pixel is the white defect. When a calculation result of (the minimum−the signal value of the target pixel) is plus and an absolute value thereof is larger than the threshold for black defect determination, the defect determining unit 33 determines that the target pixel is the black defect.

When a calculation result of (the signal value of the target pixel−the maximum) is minus and an absolute value thereof is larger than the threshold for white defect determination, the defect determining unit 33 determines that one of the peripheral pixels indicating the maximum is the white defect. When a calculation result of (the minimum−the signal value of the target pixel) is minus and an absolute value thereof is larger than the threshold for black defect determination, the defect determining unit 33 determines that one of the peripheral pixels indicating the minimum is the black defect. When an absolute value of a calculation result of (the signal value of the target pixel−the maximum) is equal to or smaller than the threshold for white defect determination and when an absolute value of a calculation result of (the minimum−the signal value of the target pixel) is equal to or smaller than the threshold for black defect determination, the defect determining unit 33 determines that both the target pixel and the peripheral pixels are not defects. A relation between the defect determination and the plus and minus of a calculation result is set as appropriate according to the order of the subtractions.

In the defect correcting circuit 11, a threshold as a reference for contrast determination (a threshold for contrast determination) is set in advance. When the target pixel is determined as the white defect or the black defect, the contrast determining unit 32 determines the level of contrast by comparing a numerical value width between the maximum and the minimum and the threshold for contrast determination. When the numerical value width is larger than the threshold for contrast determination, the contrast determining unit 32 determines that a portion as an adjustment target has high contrast. When the numerical value width is equal to or smaller than the threshold for contrast determination, the contrast determining unit 32 determines that the portion as the adjustment target has low contrast. The threshold for contrast determination is associated with an analog gain. A numerical value of the threshold for contrast determination is changed according to a gain change.

The defect determining unit 33 outputs a value closest to the signal value of the target pixel among the signal values of the peripheral pixels to the selector 36 as replacement data. When the contrast determining unit 32 determines that the portion as the adjustment target has high contrast, the selector 36 selects, as a correction value for the defect correction, the replacement data output from the defect determining unit 33 (a second correction value). For a scene having high contrast, the value closest to the signal value of the target pixel among the signal values of the peripheral pixels is adopted as the correction value. It is regarded as most important to suppress damage to an image as much as possible when inappropriate defect correction is performed.

The LPF 35 executes averaging processing for the signal values of the peripheral pixels (the maximum, the minimum, and the other signal values of the six pixels). When the contrast determining unit 32 determines that the portion as the adjustment target has low contrast, the selector 36 selects, as a correction value for the defect correction, averaged data output from the LPF 35 (a first correction value). For a scene having low contrast, the averaged data of the eight peripheral pixels is adopted as the correction value. An effect of noise reduction is regarded as most important. In this way, the defect correcting circuit 11 switches, according to the determination by the contrast determining unit 32, the output to the first correction value obtained through the averaging processing for the signal values of the eight peripheral pixels and the second correction value other than the first correction value.

When it is determined that the peripheral pixels have the white defect or the black defect, the data processing unit 34 replaces a signal value of the peripheral pixel determined as the white defect or the black defect among the peripheral pixels with the signal value of the target pixel. The noise reducing circuit 12 executes the noise reduction processing on the target pixel and the peripheral pixel including such replacement data. When the peripheral pixels have a defect, it is possible to perform the noise reduction processing while eliminating the influence of the defect by executing replacement to the replacement data. When it is determined that there is no defect in the target pixel and the peripheral pixels, the noise reducing circuit 12 executes the noise reduction processing on the target pixel and the peripheral pixels. The output of the data selected by the selector 36 is represented as A, the defect determination result by the defect determining unit 33 is represented as B, and the output from the noise reducing circuit 12 is represented as C.

Referring back to FIG. 2, the selector 23 selects, according to the defect determination result B from the defect determining unit 33 in the defect correcting circuit 11, the output A from the selector 36 in the defect correcting circuit 11 and the output C from the noise reducing circuit 12. In response to the defect determination result B indicating that the target pixel is a defect, the selector 23 selects the output A from the defect correcting circuit 11. In response to the defect determination result B indicating that the peripheral pixels have a defect or both the target pixel and the peripheral pixels do not have a defect, the selector 23 selects the output C from the noise reducing circuit 12.

In this way, in the image processing device 4, the defect correcting circuit 11 and the noise reducing circuit 12 share the line memory and the noise reduction processing is switched according to a result of the defect correction processing. This makes it possible to perform reduction of line memories and the noise reduction processing with suppressed influence of a defect. Consequently, in the solid-state imaging device, the size of the circuits can be suppressed and a high-quality image can be obtained by the defect correction and the noise reduction.

The image processing device 4 does not always execute, in response to the determination indicating that the peripheral pixels have a defect, the noise reduction processing including the replacement data by the data processing unit 34. For example, the image processing device 4 can execute the noise reduction processing on the pixels excluding a pixel determined as a defect. In this case, the data processing unit 34 excludes the signal value of the peripheral pixel determined as a defect from data as a target of the noise reduction processing. In this case, as in the case explained above, the image processing device 4 can eliminate the influence of the defect on the noise reduction processing. The data processing unit 34 is not always included in the defect correcting circuit 11 and can be provided separately from the defect correcting circuit 11.

Figure 6A:
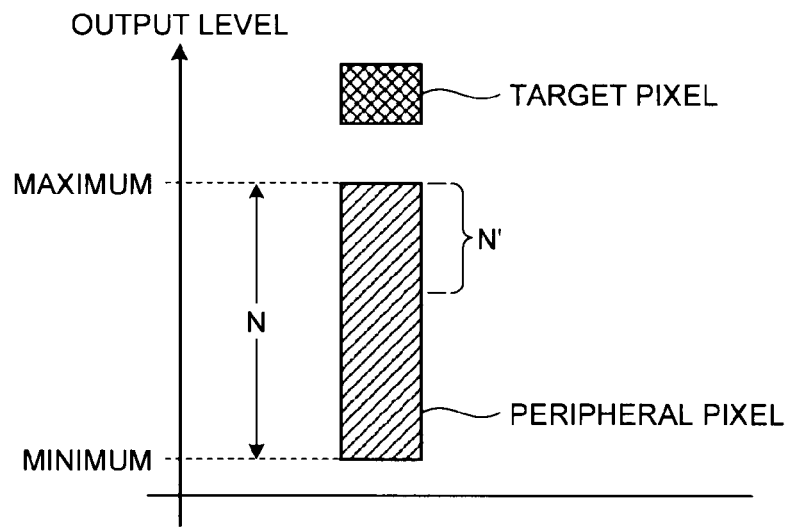
FIGS. 6A and 6B are conceptual diagrams for explaining defect determination in an image processing device according to a second embodiment.
Figure 6B:
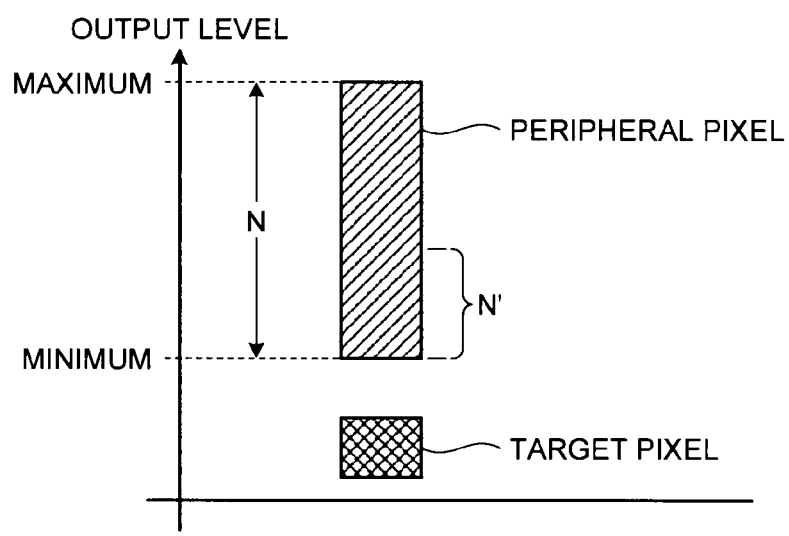

FIGS. 6A and 6B are conceptual diagrams for explaining defect determination in an image processing device according to a second embodiment. In FIG. 6A, a target pixel is a white defect. In FIG. 6B, the target pixel is a black defect. When the target pixel is determined as the white defect and a numerical value width N between a maximum and a minimum is larger than the threshold for contrast determination, the contrast determining unit 32 (see FIG. 4) determines that a portion as an adjustment target has high contrast. The LPF 35 executes the averaging processing on signal values included in a range N' in a part on the maximum side of the numerical value width N. When the target pixel is a black defect in the same case, the LPF 35 executes the averaging processing on signal values included in a range N' in a part on the minimum side of the numerical value width N.

As explained above, the defect correcting circuit 11 adopts, as the second correction value, a value obtained by extracting signal values included in a part including the maximum or the minimum in the numerical value width N and subjecting the signal values to the averaging processing. The range N' is, for example, a numerical value width equivalent to a predetermined ratio such as 30% with respect to the numerical value width N. The other kinds of processing in this embodiment are the same as those in the first embodiment. In this embodiment, it is possible to suppress damage to an image as much as possible when inappropriate defect correction is performed and obtain a noise reduction effect by the defect correction processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the sprit of the inventions. The accompanying claims and their equivalents are intended to cover such forms or modifications as would fall within the scope and spirit of the inventions.

What is claimed is:

1. An image processing device comprising:
a defect correcting circuit configured to execute defect correction on a target pixel;
a noise-reduction processing circuit configured to execute noise reduction processing on the target pixel and a plurality of peripheral pixels that are pixels for a same color as the target pixel and arranged around the target pixel; and
a first selector that selects an output by the defect correcting circuit or an output by the noise-reduction processing circuit, wherein
the defect correcting circuit includes:
a contrast determining circuit that determines a level of contrast by comparing a numerical value width between a maximum and a minimum of signal values of the peripheral pixels and a predetermined threshold;
an averaging circuit that executes averaging processing for the signal values; and
a second selector that selects, according to the determination by the contrast determining circuit, a first correction value obtained through the averaging processing for the signal values of the peripheral pixels or a second correction value which is a value closest to a signal value of the target pixel among the signal values of the peripheral pixels;
wherein
the defect correcting circuit and the noise-reduction processing circuit perform processing in parallel,
when the first selector determines the target pixel is a defect, the first selector selects the output from the second selector, and
when the first selector determines the target pixel is not a defect, the first selector selects the output from the noise-reduction processing circuit.

2. The image processing device according to claim 1, wherein the defect correcting circuit includes a defect determining circuit that determines presence or absence of a defect based on differences between the maximum and the minimum of the signal values of the peripheral pixels and the signal value of the target pixel.

3. The image processing device according to claim 1, wherein, when the target pixel is determined as a defect and the contrast determining circuit determines the numerical value width is larger than the threshold, the defect correcting circuit outputs the second correction value.

4. The image processing device according to claim 1, wherein, when the target pixel is determined as a defect and the contrast determining circuit determines the numerical value width is larger than the threshold, the defect correcting circuit outputs, as the second correction value, a value obtained through the averaging processing for a signal value extracted from a range in a part including the maximum and the minimum in the numerical value width.

5. The image processing device according to claim 1, wherein
the first selector selects an output from the noise-reduction processing circuit when it is determined that any one of the peripheral pixels is a defect, and the noise-reduction processing circuit executes the noise reduction processing while replacing the signal value of the peripheral pixel determined as the defect with a signal value of the target pixel.

6. The image processing device according to claim 1, wherein
the first selector selects an output from the noise-reduction processing circuit when it is determined that any one of the peripheral pixels is a defect, and the noise-reduction processing circuit executes the noise reduction processing while excluding the signal value of the peripheral pixel determined as the defect.

7. The image processing device according to claim 1, wherein the defect correcting circuit and the noise-reduction processing circuit share a line memory.

8. A solid-state imaging device comprising:
an imaging element that picks up a subject image;
an imaging lens that captures light made incident on the imaging element;
a defect correcting circuit configured to execute defect correction on a target pixel;
a noise-reduction processing circuit configured to execute noise reduction processing on the target pixel and a plurality of peripheral pixels that are pixels for a same color as the target pixel and arranged around the target pixel; and a first selector that selects an output by the defect correcting circuit or an output by the noise-reduction processing circuit, wherein the defect correcting circuit includes:

a contrast determining circuit that determines a level of contrast by comparing a numerical value width between a maximum and a minimum of signal values of the peripheral pixels and a predetermined threshold;

an averaging circuit that executes averaging processing for the signal values; and a second selector that selects, according to the determination by the contrast determining circuit, a first correction value obtained through the averaging processing for the signal values of the peripheral pixels or a second correction value which is a value closest to a signal value of the target pixel among the signal values of the peripheral pixels; wherein the defect correcting circuit and the noise-reduction processing circuit perform processing in parallel, when the first selector determines the target pixel is a defect, the first selector selects the output from the second selector, and when the first selector determines the target pixel is not a defect, the first selector selects the output from the noise-reduction processing circuit.

9. The solid-state imaging device according to claim 8, wherein the defect correcting circuit includes a defect determining circuit that determines presence or absence of a defect based on differences between the maximum and the minimum of the signal values of the peripheral pixels and the signal value of the target pixel.

10. The solid-state imaging device according to claim 8, wherein, when the target pixel is determined as a defect and the contrast determining circuit determines the numerical value width is larger than the threshold, the defect correcting circuit outputs the second correction value.

11. The solid-state imaging device according to claim 8, wherein, when the target pixel is determined as a defect and the contrast determining circuit determines the numerical value width is larger than the threshold, the defect correcting circuit outputs, as the second correction value, a value obtained through the averaging processing for a signal value extracted from a range in a part including the maximum and the minimum in the numerical value width.

12. The solid-state imaging device according to claim 8, wherein the first selector selects an output from the noise-reduction processing circuit when it is determined that any one of the peripheral pixels is a defect, and the noise-reduction processing circuit executes the noise reduction processing while replacing the signal value of the peripheral pixel determined as the defect with a signal value of the target pixel.

13. The solid-state imaging device according to claim 8, wherein the first selector selects an output from the noise-reduction processing circuit when it is determined that any one of the peripheral pixels is a defect, and the noise-reduction processing circuit executes the noise reduction processing while excluding the signal value of the peripheral pixel determined as the defect.

14. The solid-state imaging device according to claim 8, wherein the defect correcting circuit and the noise-reduction processing circuit share a line memory.

\* \* \* \* \*